United States Patent [19]
Blatt

[11] Patent Number: 5,938,257
[45] Date of Patent: Aug. 17, 1999

[54] POWER ACTUATED PARALLEL GRIPPER

[75] Inventor: John A. Blatt, Grosse Pointe Shores, Mich.

[73] Assignee: ISI Norgren Inc., Mt. Clemens, Mich.

[21] Appl. No.: 08/755,184

[22] Filed: Nov. 25, 1996

[51] Int. Cl.$^6$ .................................................. B25J 15/08
[52] U.S. Cl. .......................................... 294/88; 294/119.1
[58] Field of Search ................................... 294/88, 93, 97, 294/115, 116, 119.1; 269/30, 32, 34, 228; 279/4.1, 4.12, 110, 118, 119; 901/31, 36, 37, 39

[56] References Cited

U.S. PATENT DOCUMENTS

| | | |
|---|---|---|
| 1,797,836 | 3/1931 | Paul . |
| 2,126,767 | 8/1938 | Gibbons . |
| 2,212,332 | 8/1940 | Van Sittert et al. . |
| 2,229,800 | 1/1941 | Dean . |
| 2,908,114 | 10/1959 | Fouse . |
| 2,913,941 | 11/1959 | Verderber . |
| 3,051,327 | 8/1962 | Goodell et al. . |
| 3,120,046 | 2/1964 | Olsen . |
| 3,139,302 | 6/1964 | Orloff et al. . |
| 3,170,322 | 2/1965 | Cavanaugh . |
| 3,302,944 | 2/1967 | Fricks . |
| 3,371,953 | 3/1968 | Blatt . |
| 3,381,953 | 5/1968 | Miller . |
| 3,567,208 | 3/1971 | Blatt . |
| 3,630,391 | 12/1971 | Wilson . |
| 3,782,162 | 1/1974 | Bullard . |
| 4,304,433 | 12/1981 | Langowski .......................... 294/115 X |
| 4,345,866 | 8/1982 | Greene .............................. 294/119.1 X |
| 4,384,707 | 5/1983 | Poot . |
| 4,395,027 | 7/1983 | Nordmeyer . |
| 4,576,367 | 3/1986 | Horn et al. . |
| 4,641,877 | 2/1987 | Merrill . |
| 4,664,364 | 5/1987 | Lymburner . |
| 4,696,503 | 9/1987 | Collodel .......................... 294/119.1 X |
| 4,721,293 | 1/1988 | Schron et al. . |
| 4,728,137 | 3/1988 | Hamed et al. . |
| 4,834,442 | 5/1989 | Choung . |
| 4,867,428 | 9/1989 | Fricker . |
| 4,887,803 | 12/1989 | Witt . |
| 4,901,991 | 2/1990 | Bonkowski . |
| 4,905,973 | 3/1990 | Blatt . |
| 4,958,813 | 9/1990 | Dykstra . |

FOREIGN PATENT DOCUMENTS

| | | |
|---|---|---|
| 0293153 | 11/1988 | European Pat. Off. . |
| 0423556A1 | 4/1991 | European Pat. Off. . |
| 3325921 | 1/1985 | Germany . |
| 317989 | 12/1989 | Japan ................................. 294/119.1 |
| 245785 | 9/1993 | Japan ................................. 294/119.1 |
| 1187981 | 10/1985 | U.S.S.R. . |
| 1445954 | 12/1988 | U.S.S.R. ............................. 294/119.1 |
| 1470645 | 4/1989 | U.S.S.R. ............................. 294/119.1 |

*Primary Examiner*—Johnny D. Cherry
*Attorney, Agent, or Firm*—Young & Basile, P.C.

[57] ABSTRACT

A power actuated parallel gripper for engaging and holding a workpiece wherein a pair of linkage assemblies actuate a pair of jaws for linear reciprocal movement thereof and prohibit unpowered movement of the jaws from the clamped position. In the preferred embodiment, the configuration of the linkage assemblies provides for the clamping of an outer diameter of the workpiece. In a second embodiment, the configuration of the linkage assemblies may be manipulated to engage the internal diameter of the workpiece. The linear movement of the jaws is guided by a guide rod having a longitudinal axis substantially perpendicular to the longitudinal axis of the housing. The jaws cooperatively receive the guide rod through apertures provided in the jaws, and compression springs are utilized between the ends of the guide rod and the ends of the apertures provided in the jaws to maintain the position of the guide rod between the jaws.

29 Claims, 4 Drawing Sheets

POWER ACTUATED PARALLEL GRIPPER

FIELD OF THE INVENTION

The present invention relates to power actuated grippers, and more particularly, to a pneumatically operated fluid motor type power gripper having a reciprocating linear actuator coupled to a pair of linkage assemblies for actuating a pair of jaws along a predetermined linear path between a clamped position and an unclamped position.

BACKGROUND OF THE INVENTION

Power jaw-type grippers are known to be of the type in which a fluid motor provides reciprocating movement to a mechanical linkage for actuating the jaw type grippers. Normally, the fluid motor retracts the reciprocating actuator, and through a mechanical linkage, the jaws of the gripper pivot away from one another thus releasing and disengaging the workpiece. When the fluid motor actuates the reciprocating actuator toward a clamped position, the mechanical linkage drives the jaws of the gripper toward one another to engage and hold the workpiece.

Various mechanical linkages have been proposed to correctly translate reciprocating movement of a piston and piston rod to optimize the clamping force of the gripper jaws by seeking to obtain the highest mechanical advantage which can be utilized by the power stroke of the fluid motor and the mechanical linkage of the power gripper. All of these known mechanisms, more or less, include complex designs of various mechanical components at high manufacturing and assembly cost.

Occasionally, the clamping forces generated by the mechanical linkage of the power gripper are not sufficient as the work performed on the workpiece may generate or apply forces to the workpiece which are greater than the gripping forces applied by the gripper. In addition, the clamping forces generated by the mechanical linkage of the power gripper may not be sufficient to sustain the weight of the workpiece or the momentum created upon movement of the workpiece. Different geometrical configurations of the workpiece may make it difficult for the jaws of the power gripper to grasp and retain the workpiece upon engaging and moving the workpiece.

When power actuated grippers are utilized in a production environment, the power actuated grippers may lose fluid power to the fluid motor, i.e. the supply of pressurized air or hydraulic fluid may be cut-off to the fluid motor. If the grippers have engaged a workpiece in the clamped position when power is cut-off to the fluid motor, it is desirable not to have the jaws of the power gripper release the workpiece. Several known designs have been utilized to lock the grippers in the clamped position and prevent unpowered movement of the grippers from the clamped position, but such designs typically utilize rollers or over center linkage mechanisms which require high actuation forces as well as accelerated wear rates with respect to the linkage mechanisms.

Therefore, it would be desirable to provide a power actuated gripper that provides high gripping forces while also prohibiting unpowered movement of the grippers from a clamped position.

SUMMARY OF THE INVENTION

The present invention provides a power actuated parallel gripper for engaging and holding a workpiece wherein a pair of linkage assemblies actuate and move a pair of jaws between a clamped position and an unclamped position. The present invention provides a pair of jaws having reciprocal linear movement along a predetermined path and linkage assemblies that prohibit unpowered movement of the jaws from the clamped position.

The linkage assemblies are pivotally connected to a linear actuator having a longitudinal axis. The present invention provides for a first and second linkage assembly which in turn are pivotally connected to the first and second jaws, respectively. The first and second linkage assemblies are similar wherein each linkage assembly provides at least one locking link pivotally connected to the linear actuator. In addition, each linkage assembly provides for a toggle link pivotally connected to the locking link and pivotally connected to a housing of the gripper. The toggle link of each linkage assembly is pivotally connected to at least one transfer link which in turn is pivotally connected to one of the jaws. The jaws are guided for linear reciprocal movement along a guide rod wherein the guide rod has a longitudinal axis perpendicular to the longitudinal axis of the linear actuator.

To prohibit unpowered movement of the jaws from the clamped position, the linkage assemblies can be manipulated so that the jaws of the gripper contract to engage the outer diameter of a workpiece or expand to engage an internal diameter of a workpiece. In a first embodiment, the locking link of each linkage assembly is pivotally connected to one end of the toggle link, and the transfer link is pivotally connected to the opposite end of the toggle link. This allows the jaws of the gripper to contract and move toward one another to engage the outer diameter of a workpiece upon the actuation of the linear actuator. In a second embodiment, the locking link and the transfer link of each linkage assembly are pivotally connected to one end of their associated toggle link so as to share a common pivotal axis. This allows the jaws of the gripper to expand or move away from one another so as to engage the internal diameter of the workpiece upon the actuation of the linear actuator.

Thus, the objects of the present invention are to provide a new and improved power actuated parallel gripper that provides a high level of gripping force and prohibits unpowered movement of the jaws from the clamped position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

FIGS. 1–9 show a power actuated parallel gripper 10 according to the present invention. The gripper 10 provides a housing 12 connected to a linear reciprocating actuator 14. A linkage means is pivotally connected to the linear reciprocating actuator 14 and the housing 12. In addition, the linkage means is pivotally connected to a workpiece engaging means wherein the linkage means actuates the workpiece engaging means between a clamped position, wherein a workpiece 16 is secured and held for movement thereof, and an unclamped position, wherein the workpiece 16 is disengaged and released.

Figure 7:
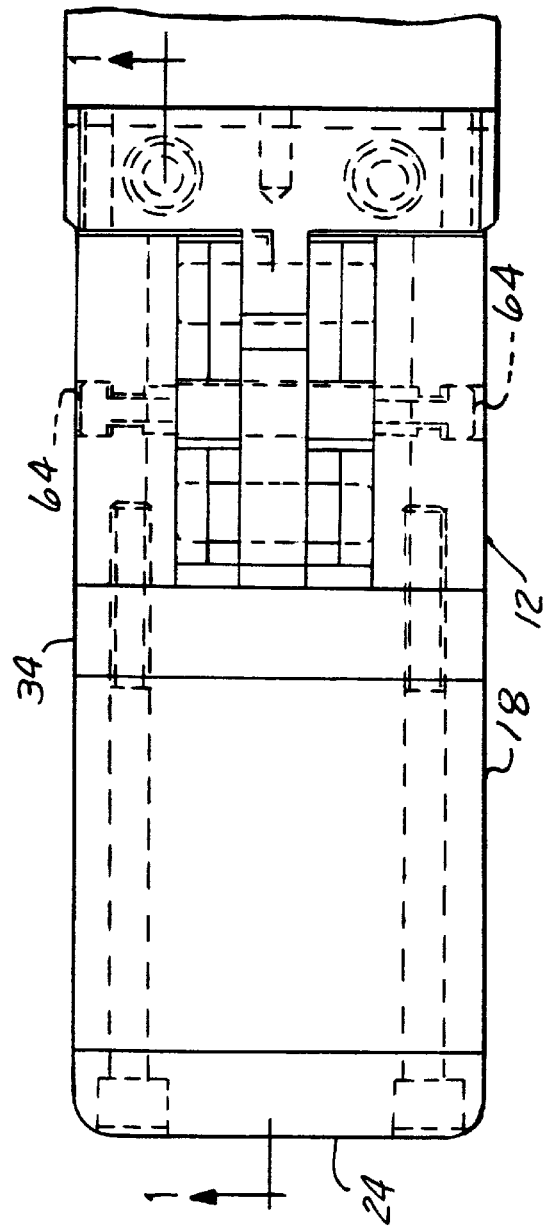
FIG. 7 is a top view showing the gripper in a clamped position.

To provide linear reciprocal movement, the linear reciprocating actuator 14 of the power actuated gripper 10 provides a fluid cylinder 18 connected to the housing 12, as seen in FIGS. 1–2 and 8–9. The fluid cylinder 18 has a cylindrical bore 20 extending through the cylinder 18 along a longitudinal axis 22 of the power actuated gripper 10. An end cap 24 is sealingly fastened to the free end of the cylinder 18 to enclose and form a piston chamber 26. A piston 28 is sealingly and slidingly disposed within the piston chamber 26, and a piston rod 30 is attached to the piston 28 and extends longitudinally from the fluid cylinder 18 into the housing 12. The piston rod 30 sealingly extends through an end wall 32 of the cylinder 18 toward the housing 12. The piston rod 30 also extends through a bushing or stopper 34 which is mounted between the housing 12 and the fluid cylinder 18. A rigid spacer 36 extending about the periphery of the stopper or bushing 34 protects the stopper 34 from damage and provides a rigid connection between the fluid cylinder 18 and the housing 12. As seen in FIG. 7, a pair of fasteners extend the length of the cylinder 18, spacer 36 and portions of the housing 12 to secure and unify the gripper 10.

As seen in FIGS. 1–2 and 8–9, the cylinder 18 has first and second fluid inlets 38 provided in the end cap 24 of the linear reciprocating actuator 14. The fluid inlets 38 remain in communication with the piston chamber 26 on opposite sides of the piston 28 and, as is well known in the art, are suitably connected by conduits (not shown) to a source of pressurized fluid (not shown). Preferably, a pressurized air source (not shown) is connected to the first and second inlets 38 in order to create a feed and bleed pneumatic linear actuator 14. Alternatively, hydraulic fluid may be utilized as a fluid medium or any other type of fluid medium that may provide for a sufficient linear reciprocating actuator.

In order for the reciprocating actuator 14 to drive the linkage means, a rod end 40 is connected to the free end of the piston rod 30 for linear movement within the housing 12. The rod end 40 is pivotally connected to the linkage means which in turn actuates the workpiece engaging means between the clamped and unclamped positions.

Figure 1:
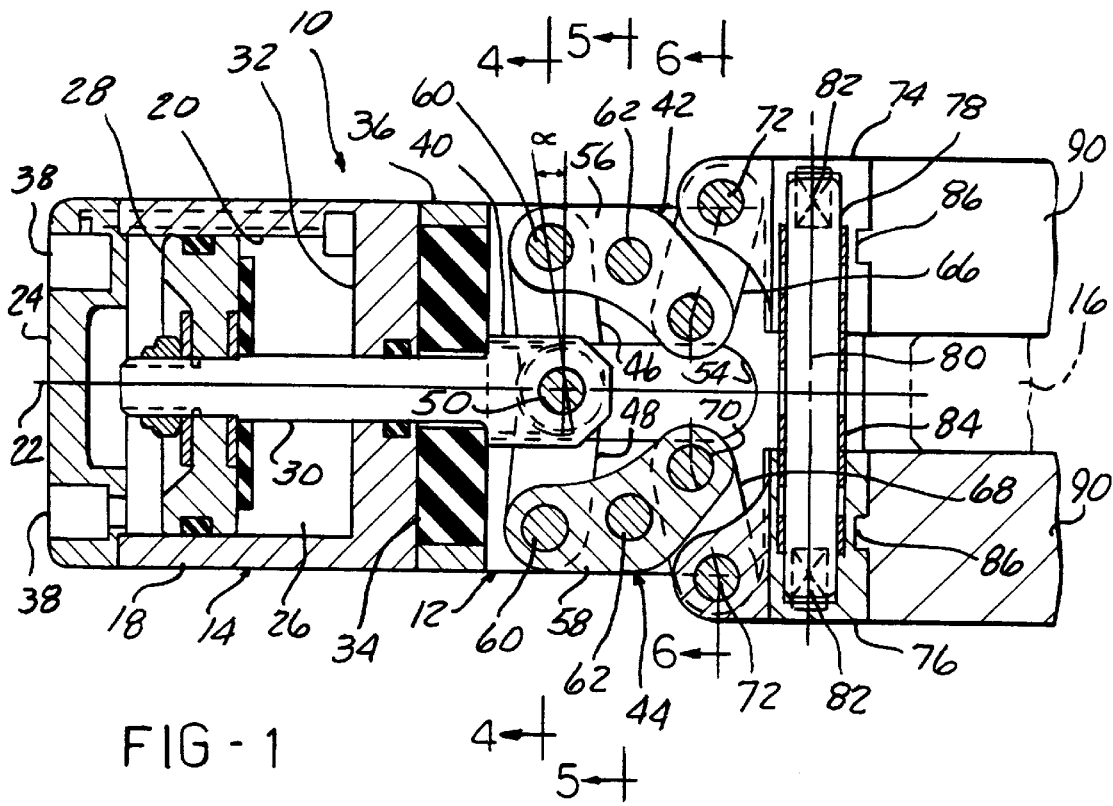
FIG. 1 is a sectional view taken in the direction of arrows 1—1 in FIG. 7 showing the gripper clamping the outside diameter of a workpiece.
Figure 2:
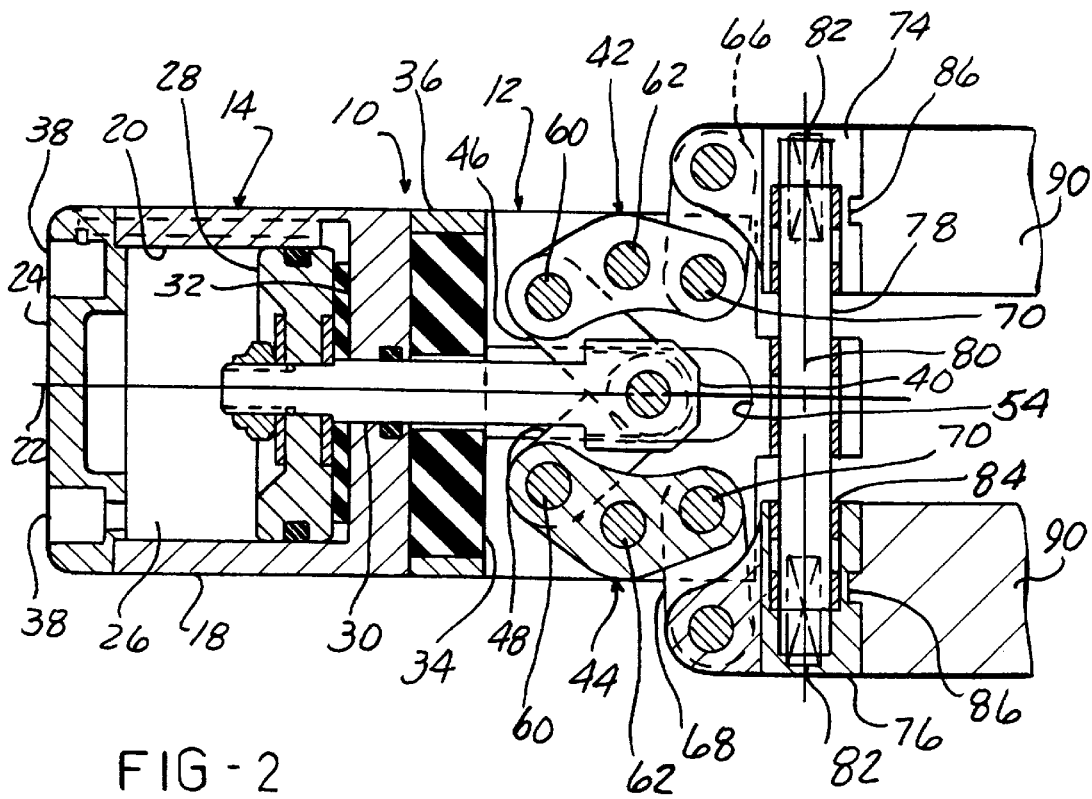
FIG. 2 is a front sectional view showing the gripper of FIG. 1 in an unclamped position.
Figure 3:
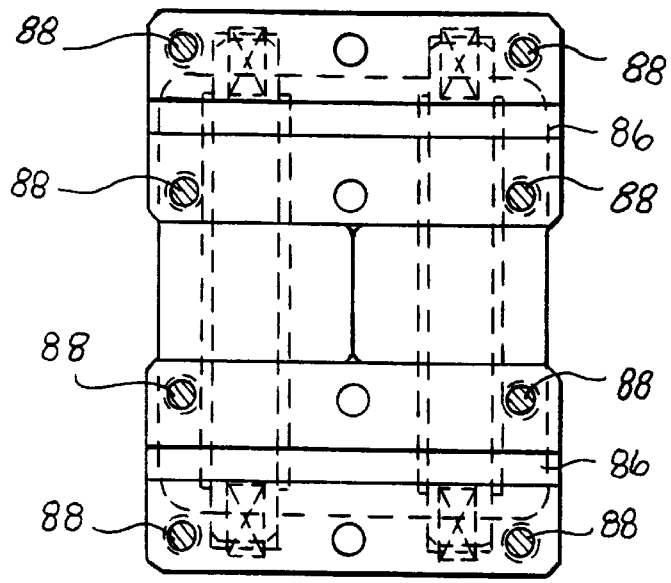
FIG. 3 is an end view of the gripper showing the jaws in a clamped position.
Figure 4:
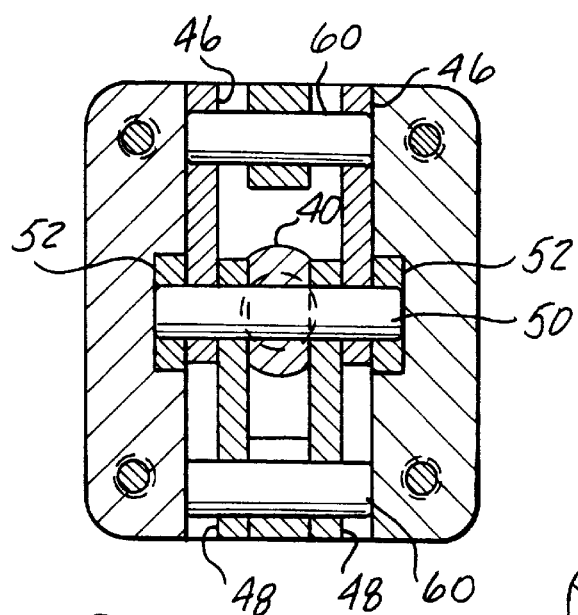
FIG. 4 is a sectional view taken in the direction of arrows 4—4 in FIG. 1 showing the gripper in a clamped position.

As seen in FIGS. 1–2 and 4, the linkage means provides a first and second linkage assembly 42, 44. Each of the first and second linkage assemblies 42, 44 provides a pair of similar locking links 46, 48, respectively. Each of the locking links 46, 48 has an aperture extending through one end of the locking links 46, 48. The apertures are commonly aligned with an aperture provided in the rod end 40, and a pivot pin 50 is inserted therethrough to provide a pivotal connection. A spacer 52 is utilized on each end of the pivot pin 50 to guide the rod end 40 through an internal guide slot 54 provided in the housing 12. The pair of first locking links 46 and second locking links 48 extend away from one another on opposing sides of the longitudinal axis 22 of the gripper 12. Both pairs of the first and second locking links 46, 48 include apertures extending through the opposite ends of the first and second locking links 46 and 48.

The first and second linkage assemblies 42, 44 each provide one toggle link 56, 58 wherein each toggle link 56, 58 has an inward curvature toward the center of the housing 12. Each of the first and second toggle links 56, 58 has an aperture extending through one end of the toggle links 56, 58. A pivot pin 60 is inserted through the apertures provided in the opposite ends of the first and second locking links 46, 48 and the one end of the first and second toggle links 56, 58, respectively, to provide a pivotal connection between the locking links 46, 48 and the toggle links 56, 58.

Figure 5:
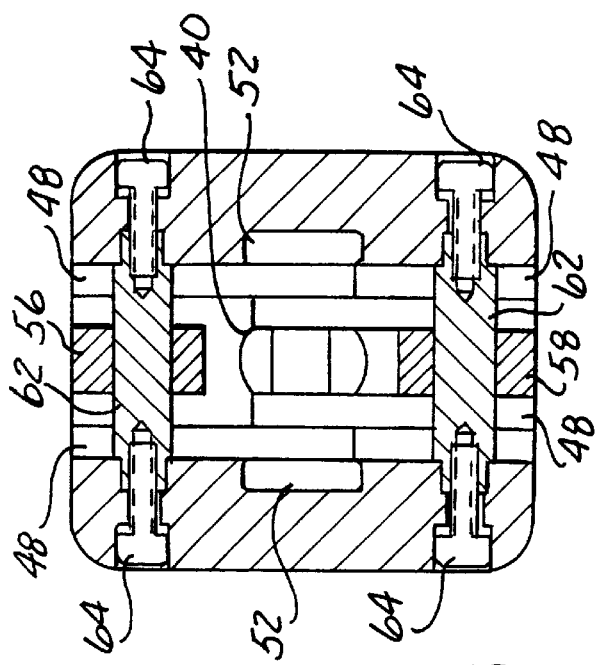
FIG. 5 is a sectional view taken in the direction of arrows 5—5 in FIG. 1 showing the gripper in a clamped position.

In order to secure the first and second linkage assemblies 42, 44 to the housing, the first and second toggle links 56, 58 are pivotally connected to the housing 12, as best seen in FIG. 5. Each of the toggle links 56, 58 provides an aperture extending through a mid-portion of the toggle links 56, 58 wherein the apertures of the toggle links 56, 58 correspond and align with apertures provided in the housing 12. A pivot pin 62 is inserted through the corresponding apertures, and threaded fasteners 64 are inserted through the apertures in the housing 12 and threaded into the ends of the pivot pins 62 to fixedly position the pivot pin 62 within the housing 12.

Figure 6:
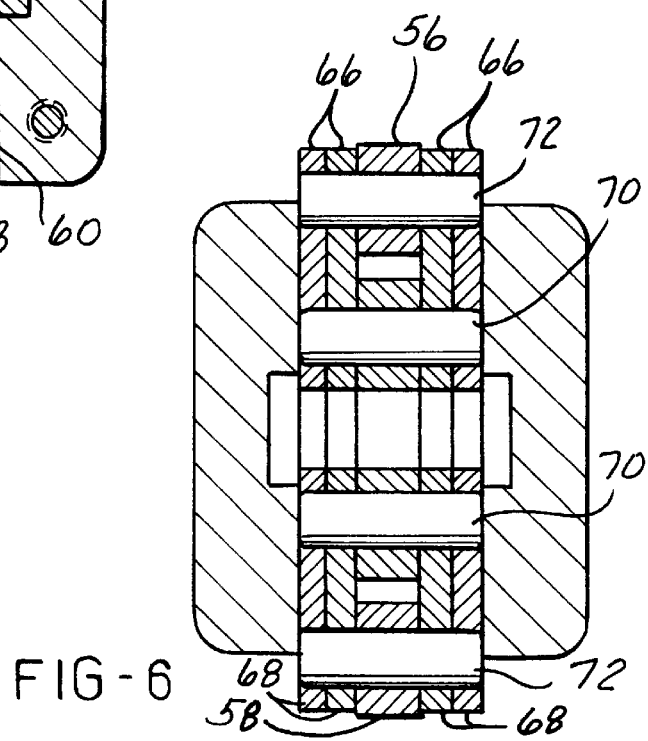
FIG. 6 is a sectional view taken in the direction of arrows 6—6 in FIG. 1 showing the gripper in a clamped position.

The opposite ends of the first and second toggle links 56, 58 also provide an aperture extending therethrough wherein two sets of four transfer links 66, 68 are pivotally connected to the opposite ends of the first and second toggle links 56, 58, respectively. As seen in FIG. 6, a pair of transfer links 66, 68 are provided on each side of each toggle link 56, 58, and each transfer link 66, 68 has an aperture extending therethrough in one end of the transfer link 66, 68. The apertures of the transfer link 66, 68 are commonly aligned with the apertures provided in the opposite ends of the toggle links 56, 58, and a pivot pin 70 is inserted through the commonly aligned apertures to provide a pivotal connection between the toggle links 56, 58 and the transfer links 66, 68.

To connect the first and second linkages assemblies 42, 44 to the workpiece engaging means, the transfer links 66, 68 extend outward beyond the housing 12 wherein the opposite ends of the transfer links 66, 68 have commonly aligned apertures extending therethrough. The workpiece engaging means provides apertures corresponding to the apertures in the opposite ends of the transfer links 66, 68 wherein a pivot pin 72 is inserted through the apertures to provide a pivotal connection between the transfer links 66, 68 and the workpiece engaging means.

In order to engage the workpiece 16, the workpiece engaging means provides a first jaw 74 and a second jaw 76 on opposing sides of the housing 12, as seen in FIGS. 1–3 and 6. As previously described, each jaw 74, 76 is pivotally connected to the transfer links 66, 68, respectively, for actuating and moving the jaws 74, 76 along a linear guide rod 78. The guide rod has a longitudinal axis 80 that is substantially perpendicular to the longitudinal axis 22 of the gripper 10. Both the first jaw 74 and the second jaw 76 provide an aperture for cooperatively receiving the ends of the guide rod 78. A compression spring 82 is housed between the ends of the guide rod 78 and the ends of the apertures provided in the jaws 74, 76. The compression springs 82 maintain the relative positioning between the jaws 74, 76 and the guide rod 78. The guide rod 78 also provides bearings 84 mounted along the periphery of the guide rod 78 to reduce the friction created from the jaws 74, 76 sliding on the guide rod 78. The jaws 74, 76 also provide a key way 86 and several threaded apertures 88 for mounting various types of clamp arms or fingers 90 for engaging the workpiece 16.

In operation, the power actuated parallel gripper 10 may be utilized to engage the outer diameter of the workpiece 16 or the inner diameter of the workpiece 16. In the preferred embodiment, the gripper 10 engages the outer diameter of the workpiece 16. The linear actuator 14 fully extends the rod end 40 into the housing 12, and the first and second linkage assemblies 42, 44 move the first and second jaws 74, 76 outward away from one another toward an unclamped position, as seen in FIG. 2. To engage and clamp the outside diameter of the workpiece 16, the linear actuator 14 retracts, and the rod end 40 actuates the first and second linkage assemblies 42, 44 to move the first and second jaws 74, 76 inward toward one another and the clamped position. The clamp arms or fingers 90 engage and hold the workpiece 16 for movement thereof, as seen in FIG. 1.

It is important to note that locking links 46, 48 should not approach an over-center condition with respect to the longitudinal axis 22 of the gripper 10. That is, the locking angle α, as seen in FIG. 1, should not drop below 5 degrees, as the actuation forces increase with the reduction of the locking angle α.

Figure 8:
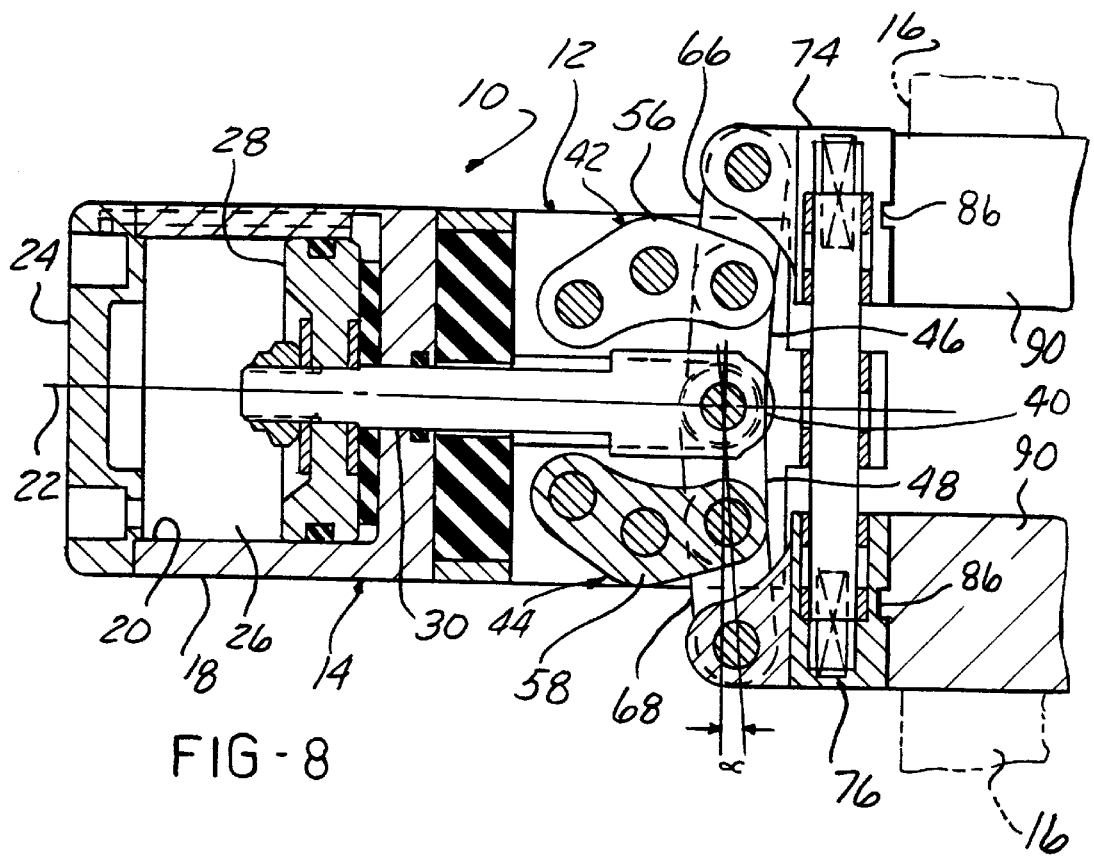
FIG. 8 is a front sectional view showing the jaws of the gripper clamping the internal diameter of a workpiece.
Figure 9:
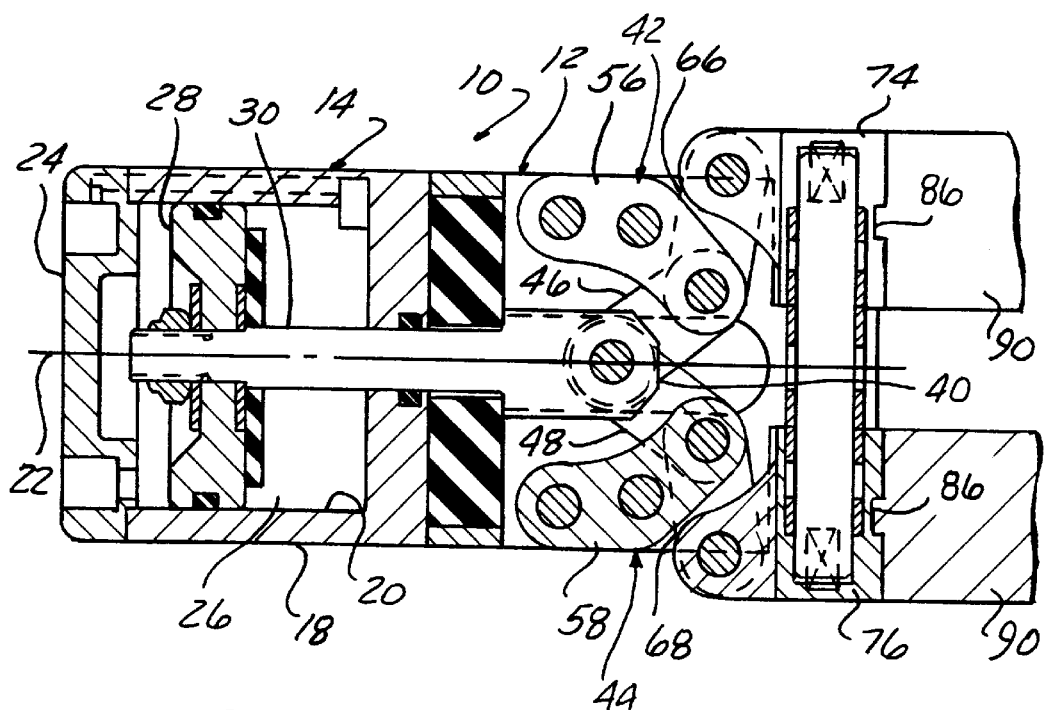
FIG. 9 is a front sectional view showing the gripper of FIG. 8 in an unclamped position.

In a second embodiment, the ends of the locking links 46, 48 and the transfer links 66, 68 are pivotally connected to the toggle links 56, 58 about a common axis, as seen in FIGS. 8 and 9. This configuration of the linkage assemblies 42, 44 allows for the clamping of an internal diameter of a workpiece 16. As seen in FIG. 9, when the linear actuator 14 retracts, the rod end 40 actuates the first and second linkage assemblies 42, 44 to move the first and second jaws inward, toward one another and the unclamped position. When the linear actuator 14 is fully extended, as seen in FIG. 8, the first and second linkage assemblies 42, 44 are actuated to move the first and second jaws 74, 76 outward, away from one another, toward the clamped position. The clamp arms or fingers 90 engage the inner diameter of the workpiece 16 to engage and hold the workpiece 16 for movement thereof.

It is also important to note in the second embodiment that the locking angle α should not drop below 5 degrees for the same reasons previously described. As seen in FIG. 8, the locking angle α is measured from the locking links 46, 48 with respect to the longitudinal axis 22 of the housing 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

I claim:

1. A power actuated parallel gripper comprising:

means for engaging a workpiece between a clamped position, wherein said workpiece is secured and held for movement thereof, and an unclamped position, wherein said workpiece is disengaged and released; and linkage means for actuating said engaging means between said clamped and unclamped positions, and said engaging means having reciprocal linear movement along a predetermined path, said actuating linkage means prohibiting unpowered movement of said engaging means from said clamped position.

2. The power actuated parallel gripper defined in claim 1, wherein said actuating linkage means comprises:

a linear actuator having a longitudinal axis; and at least one linkage assembly pivotally connected to said linear actuator and said engaging means.

3. The power actuated parallel gripper defined in claim 2, wherein said at least one linkage assembly comprises:

at least one locking link pivotally connected to said linear actuator;

at least one toggle link pivotally connected to said locking link; and at least one transfer link pivotally connected to said toggle link and pivotally connected to said engaging means.

4. The power actuated parallel gripper defined in claim 3, further comprising:

said locking link and said transfer link having a common pivotal axis with said toggle link for moving said engaging means away from said longitudinal axis of said linear actuator toward said clamped position.

5. The power actuated parallel gripper defined in claim 3, further comprising:

said locking link and said transfer link having independent pivotal axes with said toggle link for moving said engaging means toward said longitudinal axis of said linear actuator toward said clamped position.

6. The power actuated parallel gripper defined in claim 1, wherein said engaging means comprises:

at least one jaw pivotally connected to said actuating linkage means; and means for linearly guiding said jaw along said predetermined path.

7. The power actuated parallel gripper defined in claim 6, wherein said linear guiding means comprises:

at least one guide rod having a longitudinal axis;

means for reducing friction along said guide rod;

said at least one jaw cooperatively receiving said guide rod for linear movement thereon; and means for maintaining a relative position between said guide rod and said at least one jaw.

8. The power actuated parallel gripper of claim 1, the gripper engageable with a linear actuator having a longitudinal axis, wherein said linkage means comprises a locking link and transfer link operatively connected to a toggle link, wherein said locking link and said transfer link are operatively connectable to said toggle link at a common pivotal axis for moving said engaging means radially outwardly with respect to the longitudinal axis of the linear actuator toward said clamped position.

9. The power actuated parallel gripper of claim 1, the gripper engageable with a linear actuator having a longitudinal axis, wherein said linkage means comprises a locking link and transfer link operatively connected to a toggle link, wherein said locking link and said transfer link are operatively connectable to said toggle link at independent pivotal axes for moving said engaging means radially inwardly with respect to the longitudinal axis of the linear actuator toward said clamped position.

10. A power actuated parallel gripper enagable with a linear actuator having a longitudinal axis, comprising:

means for engaging a workpiece between a clamped position, wherein said workpiece is secured and held for movement thereof, and an unclamped position, wherein said workpiece is disengaged and released, said engaging means having reciprocal linear movement along a predetermined path; and linkage means, pivotally connectable to a linear actuator, for actuating said engaging means between said clamped and unclamped positions, and said actuating linkage means prohibiting unpowered movement of said engaging means from said clamped position.

11. The power actuated parallel gripper defined in claim 10, further comprising:

said linear actuator having a longitudinal axis wherein said reciprocal linear movement of said engaging means is substantially perpendicular to said longitudinal axis of said linear actuator.

12. The power actuated parallel gripper defined in claim 10, wherein said engaging means comprises:

at least one jaw pivotally connected to said actuating linkage means; and means for linearly guiding said jaw along said predetermined path.

13. The power actuated parallel gripper defined in claim 12, wherein said linear guiding means comprises:

at least one guide rod having a longitudinal axis; means for reducing friction along said guide rod; said at least one jaw cooperatively receiving said guide rod for linear movement thereon; and means for maintaining a relative position between said guide rod and said at least one jaw.

14. The power actuated parallel gripper defined in claim 10, wherein said actuating linkage means comprises:

at least one locking link pivotally connected to said linear actuator;

at least one toggle link pivotally connected to said locking link and pivotally connected to a housing; and at least one transfer link pivotally connected to said toggle link and pivotally connected to said engaging means.

15. The power actuated parallel gripper of claim 14, further comprising:

said locking link and said transfer link having a common pivotal axis with said toggle link for moving said engaging means radially outwardly with respect to the longitudinal axis of the linear actuator toward said clamped position.

16. The power actuated parallel gripper of claim 14, further comprising:

said locking link and said transfer link having independent pivotal axes with said toggle link for moving said engaging means radially inwardly with respect to the longitudinal axis of the linear actuator toward said clamped position.

17. A power actuated parallel gripper comprising:

a housing;

a linear actuator connected to said housing, and said linear actuator having a longitudinal axis;

a first and second linkage assembly pivotally connected to said linear actuator and said housing;

first and second jaws pivotally connected to said first and second linear linkage assemblies for movement between a clamped position, wherein said first and second jaws engage and hold a workpiece for movement thereof, and an unclamped position, wherein said first and second jaws disengage and release said workpiece, and said first and second jaws having linear reciprocal movement along a predetermined path substantially perpendicular to said longitudinal axis of said linear actuator; and said first and second linkage assemblies prohibiting unpowered movement of said first and second jaws from said clamped position.

18. The power actuated parallel gripper defined in claim 17, wherein said first and second linkage assemblies each comprise:

at least one locking link pivotally connected to said linear actuator;

a toggle link pivotally connected to said locking link and pivotally connected to said housing; and at least one transfer link pivotally connected to said toggle link and pivotally connected to one of said first and second jaws.

19. The power actuated parallel gripper defined in claim 18, further comprising:

said locking link and said transfer link having a common pivotal axis with said toggle link for moving said jaw away from said longitudinal axis of said linear actuator toward said clamped position.

20. The power actuated parallel gripper defined in claim 18, further comprising:

said locking link and said transfer link having independent pivotal axes with said toggle link for moving one of said first and second jaws toward said longitudinal axis of said linear actuator toward said clamped position.

21. The power actuated parallel gripper defined in claim 17, further comprising:

a guide rod having a longitudinal axis substantially perpendicular to said longitudinal axis of said linear actuator;

a bearing mounted on the periphery of said guide rod;

a compression spring seated on opposite ends of said guide rod; and said first and second jaws cooperatively engaging said guide rod for reciprocal linear movement along said longitudinal axis of said guide rod wherein said first and second jaws move simultaneously away from or toward one another to engage and disengage said workpiece.

22. A power actuated parallel gripper comprising:

means for engaging a workpiece between a clamped position, wherein said workpiece is secured and held for movement thereof, and an unclamped position, wherein said workpiece is disengaged and released, said engaging means having reciprocal linear movement along a predetermined path;

linkage means for actuating said engaging means between said clamped and unclamped positions, said linkage means including a locking link and transfer link operatively connected to a toggle link, wherein said locking link and said transfer link are selectively operatively connectable to said toggle link at a common pivotal axis for moving said engaging means in a first direction toward a first clamped position, or at independent pivotal axes for moving said engaging means in a second direction toward a second clamped position; and said actuating linkage means prohibiting unpowered movement of said engaging means from said clamped position.

23. The power actuated parallel gripper of claim 22, further comprising:
a linear actuator having a longitudinal axis; and
at least one linkage assembly pivotally connected to said linear actuator and said engaging means.

24. The power actuated parallel gripper of claim 23, wherein said engaging means comprise:
at least one jaw pivotally connected to said actuating linkage means; and
means for linearly guiding said jaw along said predetermined path.

25. The power actuated parallel gripper of claim 24, wherein said linear guiding means comprises:
at least one guide rod having a longitudinal axis;
means for reducing friction along said guide rod;
said at least one jaw cooperatively receiving said guide rod for linear movement thereon; and
means for maintaining a relative position between said guide rod and said at least one jaw.

26. The power actuated parallel gripper of claim 25, wherein said at least one locking link is pivotally connected to said linear actuator, said at least one transfer link is pivotally connected to said engaging means, and said at least one toggle link is pivotally connected to said at least one locking link and said at least one transfer link.

27. A power actuated parallel gripper comprising:
a linear actuator having a longitudinal axis;
first and second linkage assemblies pivotally connected to said linear actuator;
first and second jaws pivotally connected to said first and second linkage assemblies for movement between a clamped position, wherein said first and second jaws engage and hold a workpiece for movement thereof, and an unclamped position, wherein said first and second jaws disengage and release said workpiece, and said first and second jaws having linear reciprocal movement along a predetermined path substantially perpendicular to said longitudinal axis of said linear actuator;
said first and second linkage assemblies prohibiting unpowered movement of said first and second jaws from said clamped position;
a guide rod having a longitudinal axis substantially perpendicular to said longitudinal axis of said linear actuator;
a compression spring seated on opposite ends of said guide rod; and
said first and second jaws cooperatively engaging said guide rod for reciprocal linear movement along said longitudinal axis of said guide rod wherein said first and second jaws move simultaneously relative to one another to engage and disengage said workpiece.

28. A power actuated parallel gripper including means for engaging a workpiece between a clamped position, wherein said workpiece is secured and held for movement thereof, and an unclamped position, wherein said workpiece is disengaged and released, the improvement comprising:
linkage means for actuating said engaging means selectively in one of two modes of operation, wherein a first mode provides an outward clamping action direction and a second mode provides an inward clamping action direction, said mode of operation selected in response to connecting said engaging means operably with one of two connection locations disposed on a toggle link pivotally supported for rotation about a fixed axis, said two connection locations spaced radially from said fixed axis and spaced angularly with respect to one another about said fixed axis.

29. The improvement of claim 28 further comprising:
said actuating linkage means prohibiting unpowered movement of said engaging means from said clamped position in both said first and second modes of operation.

* * * * *